Figure 1:
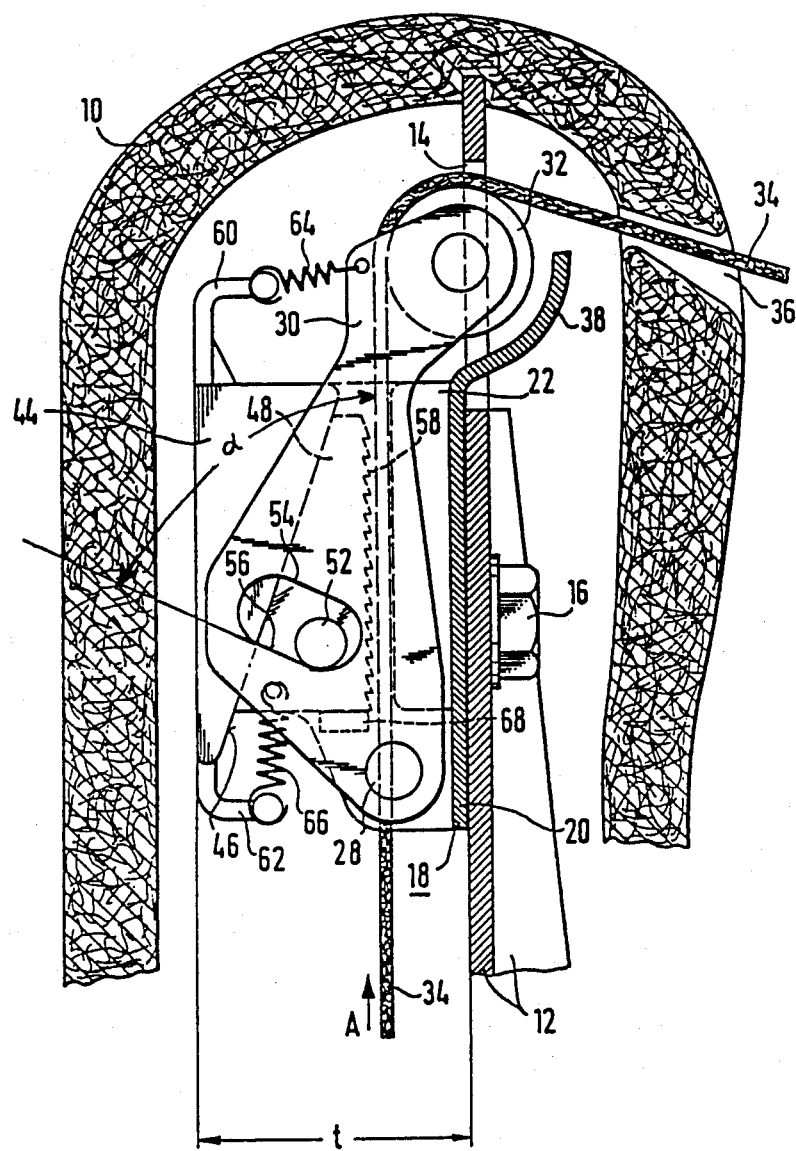

United States Patent [19]
Ernst

[11] Patent Number: 4,854,644
[45] Date of Patent: Aug. 8, 1989

[54] DEFLECTION CLAMPING DEVICE

[75] Inventor: Hans-Hellmut Ernst, Sülfeld, Fed. Rep. of Germany

[73] Assignee: Britax-Kole GmbH & Co., Dachau, Fed. Rep. of Germany

[21] Appl. No.: 192,509

[22] PCT Filed: Aug. 24, 1987

[86] PCT No.: PCT/EP87/00477
§ 371 Date: Apr. 25, 1988
§ 102(e) Date: Apr. 25, 1988

[87] PCT Pub. No.: WO88/01582
PCT Pub. Date: Mar. 10, 1988

[30] Foreign Application Priority Data

Aug. 27, 1986 [DE] Fed. Rep. of Germany ....... 3629091

[51] Int. Cl.$^4$ ............................................. A62B 35/00
[52] U.S. Cl. .................................. 297/476; 242/107.2; 297/479
[58] Field of Search ............... 297/476, 479, 480, 478; 242/107.2

[56] References Cited

U.S. PATENT DOCUMENTS

| 4,208,770 | 6/1980 | Takada | 297/476 |
| 4,323,204 | 4/1982 | Takada | 297/479 |
| 4,422,593 | 12/1983 | Takada | 297/479 |
| 4,438,551 | 3/1984 | Imai | 297/479 |
| 4,492,348 | 1/1985 | Ziv et al. | 297/479 |
| 4,549,770 | 10/1985 | Kurtti | 297/479 |
| 4,552,407 | 11/1985 | Takada | 297/476 |

Primary Examiner—Francis K. Zugel
Attorney, Agent, or Firm—Dilworth & Barrese

[57] ABSTRACT

In the deflection clamping device according to the invention, a control lever (30) acts via a sloped active surface (56) on a movable clamping member represented by a clamping wedge (48) in such a way, that when activation takes place in the direction of motion of the belt, the clamping wedge has a velocity component that is equal to the belt speed at that moment, so that no relative movement in the vertical direction of motion results between the movable clamping wedge and the belt. This is achieved by having a deflection clamping device with a small structural depth and by having low loading forces on the control lever.

11 Claims, 2 Drawing Sheets

DEFLECTION CLAMPING DEVICE

The invention relates to a deflection clamping device for a safety belt system comprising a stationary clamping member and a movable clamping member, which beyond a predetermined belt-pulling load is brought into clamping engagement with the belt and this belt into clamping engagement with the stationary clamping member.

The space availability for the mounting of a deflection clamping device is often so confined that only a component with a small structural depth (t) has a chance of finding use in practice.

It is also of significance from a technological point of view to initiate with every blocking (car-sensitive (CS) =0.45 g and web-sensitive (WS) =1.5 g) a clamped blocking, in order to be able to realise the least possible belt extraction. A prerequisite for this is, however, that an extremely gentle engagement of the clamp with the belt takes place. This is then insured if the clamp teeth only engage transversely to the belt and no relative movement takes place in the longitudinal direction of the belt, which would cause roughening of the belt. Here reference is made to DE-OS 3 543 959. Therein it is expounded that in an endurance test, 20.000 clampings blockings have to be proved. After this, the belt must still be fully loadable.

In addition, it is already known in connection with clamping devices that in order to clamp the belt, a clamping wedge is moved by means of a guide ramp slide onto the belt.

It is the object of the invention to create a deflection clamping device of the type mentioned above which has, with the insurance of a synchronized clamping engagement, a small structural depth (t).

This object is solved according to the invention in that the movable clamping member is a clamping wedge that supports itself on a stationary guide ramp which has, in the direction of extraction of the belt and in the direction towards the stationary clamping member, a sloped sliding surface for the clamping wedge, and that a control lever, supporting a belt deflection member and which is rotatable about a stationary axis, operates together with a control member acting via an active surface, orientated at an angle ($\alpha$) to the running direction of the belt upon the clamping wedge said angle thus set that the control lever, influenced by the extraction of the belt, has a velocity component in the direction of extraction of the belt that is equal to the belt extraction speed.

The clamping wedge, in connection with the control lever, allows for a relatively small structural depth in addition to the attainment of a synchronisation effect with the result that during its motion along the belt, the clamping wedge is given a velocity component pointing in the direction of extraction of the belt that is equal to the speed of belt extraction. The sliding surface of the guide ramp cannot bring this about alone, but the particular orientation of the active surface to the angle ($\alpha$) is such that adjusted to the prevailing conditions, the synchronisation effect can be achieved in a simple and effective manner.

The angle ($\alpha$) depends upon the prevailing conditions. With a short gap between the deflection clamping device and the roller (short extension length of belt), little film reel effect in the roller and little belt extension, ($\alpha$) can be small. This means, when the roller locks, relatively little belt runs through the deflection clamping device in the direction (A) (in the pulling load direction). During a time increment (t) only a few millimeters (mm) pass the toothed clamping wedge, so that the synchronizing vertical stroke of the clamping wedge need only be relatively small.

If on the other hand a larger gap exists between the roller and the deflection clamping device as well as a greater belt extension and a greater film reel effect, then a larger angle ($\alpha$) must be chosen. During the same time increment (t), a greater belt length would pass the clamping wedge, so that the clamping wedge must have a faster stroke in the vertical direction (the direction of belt extraction), when impinging on the belt, so as to be able to attain the desired synchronisation effect.

The adjusting of the angle ($\alpha$) for conformity to the prevailing conditions makes for simple and easy attainment of the synchronisation effect mentioned.

It is expedient that the control lever is arranged symmetrically to both sides of the clamping wedge, wherein an oblong hole with its longitudinal axis aligned in accordance with the mentioned angle ($\alpha$), is formed in the control lever. A projection located on the clamping wedge engages with the oblong hole. With this a wall of the oblong hole forms the mentioned active surface. By adjustment of this active surface in connection with the sloped sliding surface, the synchronisation effect strived for can be achieved.

But furthermore a projection can also be provided on the control lever that sits against a free active surface of the clamping wedge, preferably on the rear surface of the clamped wedge with regard to the direction of the belt extraction. The angle orientation of this active surface can then be adjusted in the mentioned sense.

The width of the oblong hole is in preference essentially greater than the cross-sectional dimension of the projection. This has the advantage that the projection, when it detaches itself from the active surface of the oblong hole, can move freely about the oblong hole without a force being exerted by this projection onto the control lever, when the clamping wedge, with regard to a self-clamping effect due to extraction of the belt, moves on uncontrolled due to the control lever. This means that the dimension of the oblong hole must be so much greater than the cross sectional dimension of the projection, that it equals the total movement of the clamping wedge with the belt.

With regard to a further easing of the load on a control lever during an exertion of the clamping action, a stop is provided for the control lever of the deflection roller, where the stop preferably lies in the region of the deflection member.

In accordance with a further advantageous arrangement, the guide ramp and the stationary clamping member are formed with a frame as a fixed unit in which the clamping wedge is arranged so as to be movable via the control lever and moreover freely movable beyond that. This leads to a mutual compensation of the occurring clamping forces perpendicular to the direction of belt extraction.

It is of advantage that for the reduction of friction, the deflection member is in the form of a deflection roller and that the mentioned stop being a part of the frame, is adapted to the roller by the corresponding curvature. The deflection roller lies under load against the stop when the clamping wedge is arranged with the belt (clamping). Consequently the deflection roller is now acted upon by the load. In this way the control lever remains unloaded.

Restoring springs are mounted on the frame or on the guide ramp, one of which is mounted on the control lever and the other on the clamping member, so as to return the clamping wedge and also the control lever into an original position after the releasing of the belt.

With regard to further maintaining the structural depth (t) small, the control lever is essentially arranged in a parallel orientation to a mounting wall, wherein the deflecting member at least partially juts into an opening of the mounting wall. The swivelling axis of the control lever is also situated in the direct vicinity of the mounting wall. Consequently, a narrow edge extends itself perpendicular to the belt, that is to say in the direction of the structural depth (t).

Figure 2:
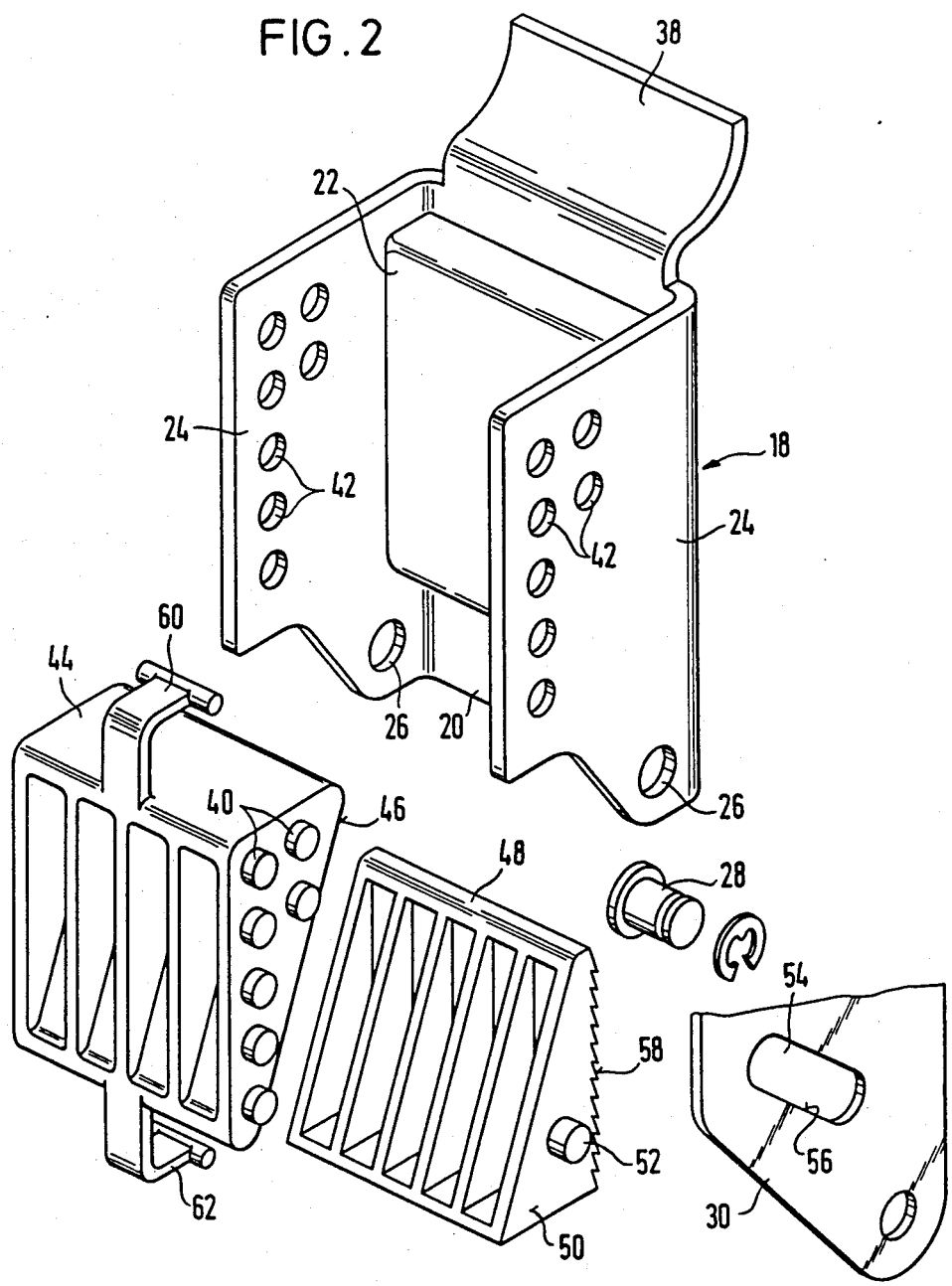

As detailed below, the invention is further explained by the already schematically represented drawings of the embodiments, in which:

FIG. 1 shows a partially sectioned side view of a deflection clamping device, that is housed in the back rest of a vehicle seat, and FIG. 2 shows an exploded view of a part of the deflection clamping device according to FIG. 1.

The deflection clamp for a safety belt system shown in FIG. 1 is housed here for example in the back rest (10) of a vehicle seat. Such a deflection clamping device can also be housed in the so-called B-column of a car hull. It is valid for every case of accommodation of the deflection clamping device that only a narrow space is available for the accommodation and therefore the structural depth (t) shown in FIG. 1 must be as small as possible.

Inside the partially shown back rest (10) of FIG. 1, a mounting wall (12) is located that has an opening (14) in its upper region. A frame (18), clearly visible in FIG. 2 is fastened by means of a screw (16) with this mounting wall (12), in fact to a rear wall (20), to which a counter-pressure surface (22) acting as a clamping member is mounted on the inside of the frame. In opposing side walls (24) of the essentially U-shaped frame (18) bearing openings (26) are located in the vicinity of the lower region of the rear wall (20) shown in FIG. 2. Pivot studs (28) of a control lever (30) sit in these bearing openings. On each side of the frame such a control lever (30) is provided. The control lever (30) runs along its longitudinally orientated length essentially parallel to the rear wall (20) or the mounting wall (12) and supports on the opposite, free end of the pivot studs (28) a deflection roller (32) over which a belt (34) of a safety belt system is passed in such a way, that the safety belt is directed into an opening (36) of the back rest (10) towards the seating area of the vehicle seat. At the same time the deflection roller projects partially into the opening (14) of the mounting wall (12). Opposite the deflection roller (32) the rear wall (20) of the frame has a rounded stop-wall (38) that projects into the opening (14).

A guide ramp (44) is securely fastened to the frame (18) and consequently with the mounting wall (12) via projections (40) and holes located in the side walls (24). Opposite the counter-pressure surface (22), the guide ramp (44) has a sliding surface (46) that is aligned according to the representation in FIG. 1. Located between the counter-pressure surface (22) and the guide ramp (44) is a clamping wedge (48), which acts as a movable clamping member, that is provided with control projections (52) on the opposing side surfaces (50). These control projections jut into an oblong hole (54) on the control lever (30) in such a way that the control projections (52) lie on the active surface (56), orientated at an angle ($\alpha$), of the oblong holes. The diameter of the projections (52) is essentially smaller than the cross-sectional dimension of the oblong holes (see FIG. 1).

The clamping wedge (48) has a toothed clamping surface (58). Between this clamping surface (58) and the counter-pressure surface (22), the belt (34) runs along the direction shown in FIG. 1.

A holding tongue (60) and a holding tongue (62) are attached at the upper and lower end of the guide ramp. On the free end of the upper holding tongues (60), a restoring spring (64) is attached which is secured with its other end to the upper end of the control lever. A further restoring spring (66) is attached to the lower holding tongue (62) and is secured with its other end to the clamping wedge (48). The restoring spring (64) serves the purpose of bringing the control lever (30) back to its original position after the release of the belt and the restoring spring (66) serves the purpose of bringing the clamping wedge (48) back to its original position under these conditions. The underside of the clamping wedge (48) lies against a stop (68) under these conditions.

At this point the mode of operation of the deflection clamping device shall be described.

When the belt is pulled off a roller with a particular acceleration in the direction of the arrow A shown in FIG. 1, a force is thereby exerted on the deflection roller (32) that produces a rotation in the control lever (30) of FIG. 1 in a clockwise direction. This rotation has the effect that the active surface (56) of the oblong holes (54) moves the projections (52) of the clamping wedge (48) with a transmission adapted to the conditions in a direction perpendicular to the belt and in the direction of the arrow A, so that the velocity component in the direction of the arrow A is equal to the speed of the belt, which via the control lever (30) initiated the movement of the clamping wedge (48). As soon as a sufficient engagement of the clamping surface (58) with the belt (34) takes place against the counter-pressure surface (22), a further clamping movement and clamp strengthening automatically results with the extraction of the belt (34). Since to a large extent through the afore-mentioned synchronisation effect no relative movement between the clamping surface (58) and the belt (34) results, there is no danger of damage to or weakening of the belt (34), even if the clamping often occurs at a lower acceleration rate of the belt of 0.5 g.

When the belt (34) is released, the restoring springs (64 and 66) pull the control lever (30) and the clamping wedge (48) back into the original position shown in FIG. 1, in which the belt (34) can move freely between the clamping surface (58) and the counter-pressure surface (22)

I claim:

1. A deflection clamping device for a safety belt system comprising a stationary clamping member and a movable clamping member which is brought into clamping engagement with the belt in response to a predetermined belt-pulling load, said belt being brought into clamping engagement with the stationary clamping member, characterized in that the movable clamping member is a clamping wedge (48) that supports itself on a stationary guide ramp (44), which has, in the direction of extraction of the belt (A) and in the direction towards the stationary clamping member 22), a sloped sliding surface (46) for the clamping wedge (48), said deflection clamping device being further characterized in that a control lever (30), supporting a belt deflection member (32) and being rotatable about a stationary axis (28), operates together with a control member 52), said control lever acting via an active surface (56) upon the clamping wedge (48), said active surface being oriented at an angle to the direction (A) of extraction of the belt, said angle set such that the clamping wedge (48), influenced by the extraction of the belt, has a velocity component in the direction of belt extraction (A) that is equal to the belt extraction speed at the appropriate moment.

2. The deflection clamping device according to claim 1, characterized in that the control lever (30) is arranged on both sides of the clamping wedge (48), that the control lever (30) is formed with an oblong hole (54), whose longitudinal axis is oriented according to the mentioned angle at least with regard a longitudinal edge, and that a projection (52) located on the clamping wedge (48) engages with the oblong hole (52).

3. The deflection clamping device according to claim 1, characterized in that the control lever (30) is disposed on both sides of the clamping wedge (48) and that the control lever (30) has a pin engaging the active surface of the clamping wedge.

4. The deflection clamping device according to claim 2, characterized in that the width of the oblong hole (54) is essentially greater than the cross-sectional dimension of the pin 52.

5. The deflection clamping device according to claim 1, characterized in that a stop (38) is provided for the control lever (30).

6. The deflection clamping device according to claim 1, characterized in that the movable clamping member (48) is displacable against the action of a spring in the direction of belt extraction (A).

7. The deflection clamping device according to claim I, characterized in that the guide ramp (44) and the stationary clamping member (22) form a fixed unit with a frame (18) in which the clamping wedge (48) is movable via the control lever (30).

8. The deflection clamping device according to claim 1, characterized in that the deflection member (32) is a deflection roller.

9. Deflection clamping device according to claim 8, characterized in that the deflection roller (32) is positioned by stop (38) of the frame (18).

10. The deflection clamping device according to claim 1, characterized in that restoring springs (64, 66) are attached to the frame (18) or the guide ramp (44), and of which one (64) is attached to the control lever (30) and the other (66) to the clamping wedge (48).

11. The deflection clamping device according to claim 1, characterized in that the control levers (30) run essentially parallel to a mounting wall (12), in fact to a swivelling axis (28) lying parallel to the mounting wall, that with this the reflection member (12) projects at least partially into an opening (14) of the mounting wall (12) and that the swivelling axis (28) lies near the mounting wall (12).

* * * * *

UNITED STATES PATENT AND TRADEMARK OFFICE
CERTIFICATE OF CORRECTION

PATENT NO. : 4,854,644

DATED : August 8, 1989

INVENTOR(S) : Hans-Hellmut Ernst

It is certified that error appears in the above-identified patent and that said Letters Patent is hereby corrected as shown below:

On the title page of the patent, after "Assignee:"

"Britax-Kole" should be --Britax-Kolb--.

Signed and Sealed this

Nineteenth Day of June, 1990

Attest:

*Attesting Officer*

HARRY F. MANBECK, JR.

*Commissioner of Patents and Trademarks*